United States Patent [19]
Janssens

[11] Patent Number: 5,969,007
[45] Date of Patent: *Oct. 19, 1999

[54] MASTER BATCH FOR USE IN THE PRODUCTION OF BI-AXIALLY ORIENTED POLYALKYLENE FILMS

[75] Inventor: Marcel Janssens, Dendermonde, Belgium

[73] Assignee: A. Schulman Plastics N.V., Bornem, Belgium

[ * ] Notice: This patent issued on a continued prosecution application filed under 37 CFR 1.53(d), and is subject to the twenty year patent term provisions of 35 U.S.C. 154(a)(2).

[21] Appl. No.: 08/809,212
[22] PCT Filed: Sep. 12, 1995
[86] PCT No.: PCT/EP95/03575
  § 371 Date: Mar. 17, 1997
  § 102(e) Date: Mar. 17, 1997
[87] PCT Pub. No.: WO96/09336
  PCT Pub. Date: Mar. 28, 1996

[30] Foreign Application Priority Data

Sep. 16, 1994 [DE] Germany ............... 44 33 166

[51] Int. Cl.⁶ ..................................... C08K 3/34
[52] U.S. Cl. ........................... 523/205; 524/445
[58] Field of Search ................ 523/220, 205; 524/442, 445, 450

[56] References Cited

U.S. PATENT DOCUMENTS

| | | | |
|---|---|---|---|
| 3,876,608 | 4/1975 | Anderson | 523/220 |
| 4,187,210 | 2/1980 | Howard | 523/220 |
| 4,420,582 | 12/1983 | Canard | 524/450 |
| 4,652,489 | 3/1987 | Crass | 428/337 |
| 4,720,420 | 1/1988 | Crass | 428/216 |
| 4,758,619 | 7/1988 | Mita | 524/450 |
| 4,785,042 | 11/1988 | Azuma | 524/450 |
| 4,912,091 | 3/1990 | Bothe | 428/35.2 |
| 4,965,123 | 10/1990 | Swan | 428/314.4 |
| 5,026,592 | 6/1991 | Janocha | 428/204 |
| 5,116,885 | 5/1992 | Hattori | 523/220 |
| 5,166,240 | 11/1992 | Sakazume | 524/451 |
| 5,179,160 | 1/1993 | Orikasa | 524/445 |
| 5,342,876 | 8/1994 | Abe | 524/442 |

FOREIGN PATENT DOCUMENTS

| | | |
|---|---|---|
| A0 242 055 | 10/1987 | European Pat. Off. . |
| A0 361 280 | 4/1990 | European Pat. Off. . |
| A0 454 420 | 10/1991 | European Pat. Off. . |
| A6-200 092 | 7/1994 | Japan . |
| A67 676 | 12/1973 | Luxembourg . |

*Primary Examiner*—Paul R. Michl
*Attorney, Agent, or Firm*—Jones & Askew, LLP

[57] ABSTRACT

The invention is directed to a masterbatch for the production of biaxially oriented polyalkylene films which, based on the total amount, contains in a matrix of polyalkylene homopolymer or copolymer from 1 to 50% by weight of spherical solid silicate particles and optionally, from 0.1 to 15% by weight of a surface-modifying reagent which reacts with the surface of the silicate, thus improving the adherence between the silicate and the polyalkylene. The invention is also directed to a process for the production of such a masterbatch, its use in the production of biaxially oriented polyalkylene films, and to biaxially oriented, co-extruded multilayer polyalkylene films.

11 Claims, 1 Drawing Sheet

FIGURE 1
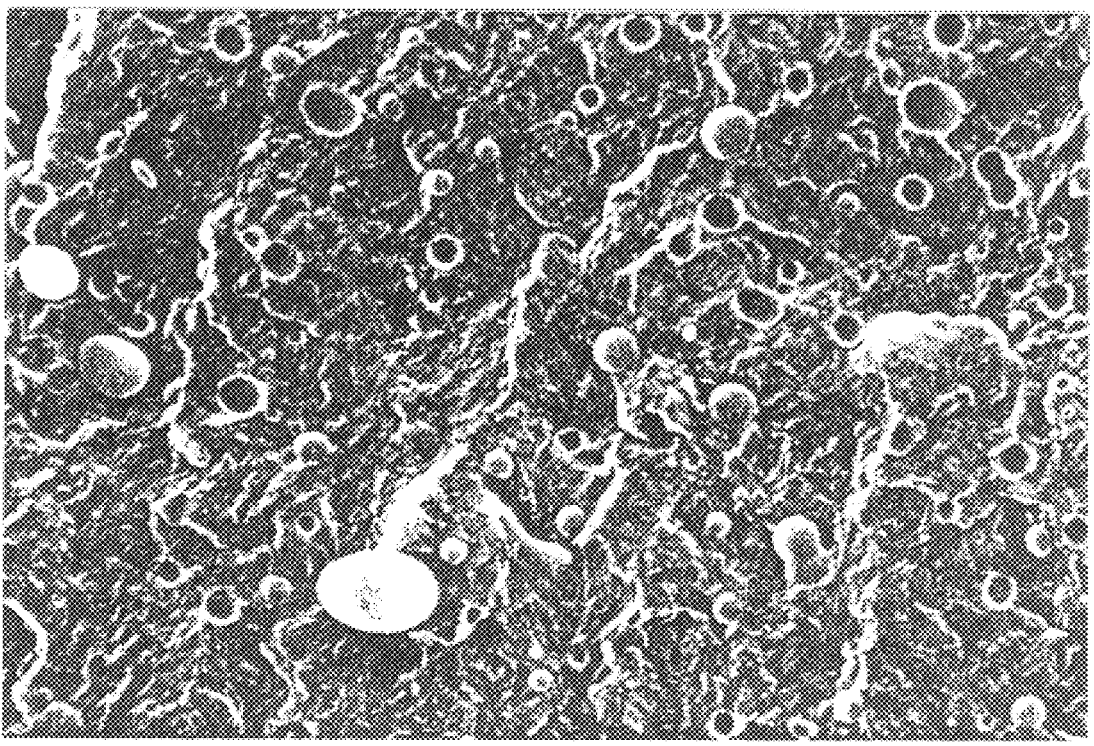
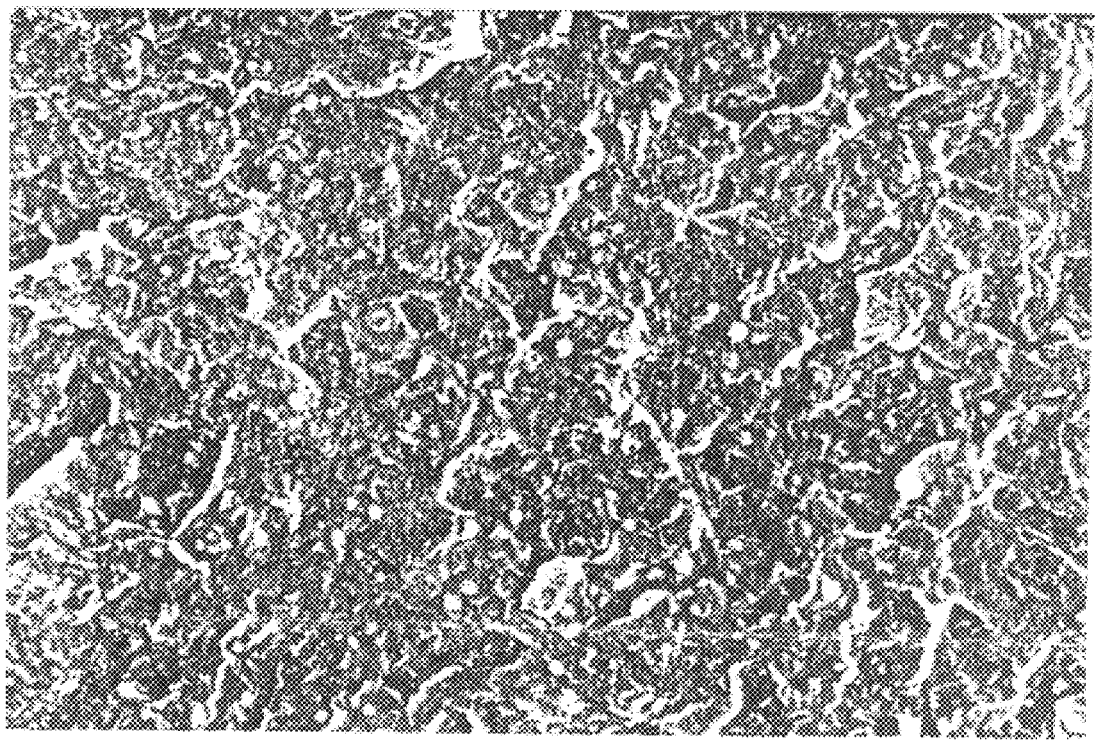
FIGURE 2

MASTER BATCH FOR USE IN THE PRODUCTION OF BI-AXIALLY ORIENTED POLYALKYLENE FILMS

The invention relates to a masterbatch for the production of biaxially oriented polyalkylene films, a process for producing said masterbatch, the use of the masterbatch, and to biaxially oriented, co-extruded multilayer polyalkylene films containing said masterbatch.

In recent years, biaxially oriented polyalkylene films have gained more and more importance. They are mainly used as packing material for transparent packaging, and they are high in gloss, scratch-proof and durably transparent. Therefore, they represent a good alternative for cellophane as packing material.

These films may also be produced as co-extruded multilayer films consisting of a core layer and an exterior layer. However, the production of these multilayer films, in particular, frequently causes problems. Thus, in films used for printing or laminating, the exterior layer generally consists of a polyalkylene homopolymer, or of a polyalkylene random copolymer for hot-sealable films which are metallized, for example.

Such films have high film-to-film and film-to-metal friction coefficients, causing the films to adhere to each other and to develop a tendency of becoming sticky when surface pressure is applied, thereby making it difficult to use them in automated packaging machinery.

It is known from prior art to avoid these drawbacks by adding specific additives to the polymer to be processed, which prevent these effects. These additives include compounds such as natural and/or synthetic silica, talc, calcium carbonate and silicates, which are employed as hollow particles or as powders.

However, adding these additives is disadvantageous in that the optical properties of films produced from such a polymer are deteriorated. In particular, these additives frequently give rise to a decrease in gloss and an increase in haziness of the films. Another drawback is that when slitting the film, poor dispersion of fillers within the polyalkylene matrix and insufficient binding of the fillers to the polyalkylene matrix will cause powdery deposits on the film and the slitting machine, thereby substantially deteriorating the properties of the film on the one hand, and making the film more difficult to process on the other hand.

Therefore, it is the technical object of the invention to provide more suitable fillers and an appropriate additive that does not have the disadvantages described above and, in particular, provides improved dispersion and binding of the fillers within the polyalkylene matrix.

Said object is attained by using a masterbatch in the production of biaxially oriented polyalkylene films which, based on the total amount of masterbatch, contains in a matrix of polyalkylene homopolymer or copolymer from 1 to 50% by weight, preferably from 1 to 10% by weight of spherical solid silicate particles and optionally, from 0.1 to 15% by weight, preferably 10% by weight of a surface-modifying reagent which reacts with the surface of the silicate, thus improving the adherence between the silicate and the polyalkylene. In a preferred embodiment, the matrix for the masterbatch is a polypropylene homopolymer or a polypropylene random copolymer.

Within the scope of the present invention, masterbatch is understood to be a base mixture, particularly a granulate, dust-free composition of the components described above, namely polyalkylene as the matrix, spherical solid silicate particles and optionally, a surface-modifying reagent. Such a masterbatch is used in the production of said biaxially oriented films or other films together with the plastic raw material and is extruded with same to yield the product.

In principle, those surface-modifying reagents are possible which react with the surface of the silicate, thus improving the adherence between the silicate and the polyalkylene. Particularly suitable are polypropylene or polyethylene of low or high density having from 0.5 to 2% by weight of grafted maleic anhydride, or an ethylene-acrylic acid copolymer. "Grafting" is understood as opening the polymeric chain and subsequent binding of the chain ends to maleic anhydride.

In a preferred embodiment, especially the following compounds were found to be effective: polypropylene or polyethylene each having from 0.1 to 10% by weight of grafted maleic anhydride as surface-modifying reagent.

As silicates, only those can be used within the meaning of the present invention which are formed as spherical, solid particles. The particle diameter of the solid, spherical silicate preferably ranges from 2 to 4 $\mu$m. Sodium calcium aluminum silicate and potassium calcium aluminum silicate as well as pure aluminum silicate are used as the preferred silicates.

Using the masterbatch of the invention, excellent results can be achieved in the production of biaxially oriented polyalkylenes, especially polypropylene films and polyethylene films. These results are due to the excellent anti-blocking effect of the masterbatch according to the invention, the favorable slip behavior and improved optical properties of the films produced therefrom, as well as the improved adhesion of the inorganic additive to the polyalkylene matrix in the films produced.

The production of the masterbatch according to the invention is performed using devices usually employed for compounding. For example, there may be mentioned: single-screw or double-screw extruders or Banbury type mixing devices.

In the production of the masterbatch, the polyalkylene homopolymer or polyalkylene copolymer together with the spherical silicates and optionally, the surface-modifying agent are introduced into the compounding device, melted and compounded, subsequently cooled and granulated. During compounding, the preferably added surface-modifying reagent will react with the surface of the silicate particles, thus enhancing binding between the spherical, inorganic surface of the silicate material and the organic, polymeric matrix. The result of this reaction is excellent dispersion and adherence of the inorganic silicate particles to the organic polypropylene matrix. When using the thus produced masterbatch of the invention as an anti-blocking agent in the exterior layers of biaxially oriented polyalkylene films, biaxially oriented polyalkylene films may be produced having properties, particularly with respect to haziness, gloss, friction coefficient and anti-blocking effect, which are far superior to those according to prior art.

Referring to the appended figures, the advantages of the masterbatch according to the invention will be illustrated.

FIG. 1 shows a masterbatch after cutting, which has spherical sodium calcium aluminum silicate particles and no surface-modifying additive.

FIG. 2 shows a masterbatch after cutting, which includes sodium calcium aluminum silicate and a surface-modifying additive. The pictures were taken using a scanning electron microscope, after one granulate grain of each masterbatch had been cut and the surface examined under the scanning electron microscope. From the figures, it can be seen that the masterbatch without the surface modifying agent exhibits spherical particles which are not dispersed in and bound to the polymeric matrix. When slitting the film, these particles may appear as powdery residues. In contrast, the masterbatch according to the invention shown in FIG. 2 has high surface properties and exhibits nearly perfect binding and dispersion of the spherical particles within the matrix. In FIG. 2, no unbound spherical particles can be seen. Hence, powdery residues do not appear when slitting films produced using these masterbatches.

In this fashion, the masterbatch according to the invention may be used in the production of biaxially oriented polyalkylene films.

The invention is also directed to a biaxially oriented, co-extruded multilayer polyalkylene film having a thickness of from 5 to 200 µm, consisting of a core layer and one or more exterior layers and containing the masterbatch of the invention in the exterior layer. Preferably, the exterior layer has a thickness of from 0.2 to 5 µm. The masterbatch according to the invention is contained in the exterior layer in an amount of from 1 to 10% by weight. It is particularly preferred that the exterior layer consists of a polypropylene homopolymer or a polypropylene random copolymer.

When using the anti-blocking masterbatches known from prior art, films having limited optical properties are usually formed. When using standard spherical aluminum silicates, powdery residues are formed on the film surface as well as on the slitting devices used for these films.

Using the masterbatch of the invention, which contains sodium calcium aluminum silicate as anti-blocking agent in a polymeric matrix and optionally, the surface-modifying reagent, films having substantially improved properties can be produced. As silicates, those are particularly preferred which have a refractive index nearly identical to that of the respective polyalkylene used. Indeed, it has been found that masterbatches containing silicates which have a refractive index similar to that of the polymeric matrix result in improved optical properties in the films produced by using same. Thus, when using polypropylene, for example, sodium calcium aluminum silicate or aluminum silicate is particularly preferred. The following Table 1 shows refractive indices for various materials.

| Substance | Refractive Index |
| --- | --- |
| Polypropylene | 1.49 |
| Silica | 1.44 |
| Talc | 1.56 |
| Na—Ca—Al silicate | 1.50 |
| Aluminum silicate | 1.62 |

The following examples are intended to illustrate the invention in more detail.

EXAMPLES

Examples 1–3, Comparative Examples 1 and 2

In the following Examples 1–3, masterbatches according to the invention were produced and tested for their properties in the final products. The following Table 2 shows several examples of mixtures produced on a ZSK 30 Werner Pfleiderer compounding device. The individual components were mixed, melted, compounded, and subsequently cooled and granulated. All the figures in the following Table are given in % by weight. Matrix adhesion was determined using a scanning electron microscope.

TABLE 2

| Substance | C1 | C2 | 1 | 2 | 3 |
| --- | --- | --- | --- | --- | --- |
| PP homopolymer | 95 | — | 90 | — | — |
| PP random copolymer | — | 95 | — | 90 | 90 |
| Na—Ca aluminum silicate | 5 | 5 | 5 | 5 | 5 |
| PP grafted with 1% MA | — | — | 5 | 5 | — |
| EAA | — | — | — | — | 5 |
| Matrix adhesion | P | P | G | G | G |

PP = Polypropylene
MA = Maleic anhydride
EAA = Ethylene-acrylic acid copolymer
C = Comparative example
P = Poor
G = Good From the examples it can be seen that when using a polypropylene matrix having spherical silicates alone without a surface-activating reagent, only poor matrix adhesion is achieved. In contrast, when using surface-activating reagents, the matrix adhesion is considerably improved.

Examples 4 and 5, Comparative Examples 3–6

A biaxially oriented polypropylene film is produced. A co-extruded homopolymer film 20 µm in thickness, having a homopolymer exterior layer 1 µm in diameter, contains various anti-blocking agents. A masterbatch having a concentration of 5% by weight, added at a concentration of 3% by weight was used as anti-blocking agent, so that the final addition to the exterior layer was 1500 ppm. In Comparative example 6, an aluminum silicate in the form of hollow, spherical particles was used. In Example 4, a solid spherical Na-Ca aluminum silicate was used, and in Example 5, a Na-Ca aluminum silicate grafted with maleic anhydride was employed.

The properties of the thus produced films as a function of the silicates used in the masterbatch can be inferred from Table 3.

TABLE 3

| | C3 | C4 | C5 | C6 | E4 | E5 |
| --- | --- | --- | --- | --- | --- | --- |
| Anti-blocking agent | s. SiO$_2$ | n. SiO$_2$ | CaCO$_3$ | Al silicate | Na—Ca—Al silicate | g. Na—Ca—Al silicate |
| Diameter | 4 µm | 5 µm | 3 µm | 3 µm | 3 µm | 3 µm |
| Haziness | 0.8 | 1.4 | 1.6 | 1.0 | 0.6 | 0.7 |
| Gloss | 86 | 84 | 83 | 86 | 90 | 90 |
| Friction coefficient F/F | 0.6 | 0.6 | 0.7 | 0.5 | 0.3 | 0.3 |
| Blocking force g/100 cm | 8 | 17 | 28 | 12 | 8 | 10 | s. = synthetic
n. = natural
g. = grafted with MA
E = Example

TABLE 3-continued

| | C3 | C4 | C5 | C6 | E4 | E5 |
|---|---|---|---|---|---|---|

C = Comparative example
The haziness was measured according to ASTM D 1003.
The gloss was measured according to ASTM D 2257.
The film-to-film friction coefficient was measured according to DIN 53375.
The anti-blocking properties were measured according to ASTM 3354 after pre-blocking the film over 1 hour at 80° C. using a weight of 16 kg/100 cm.

From Table 3 it can be seen that when using spherical, solid silicate particles, as opposed to hollow spherical silicate particles, good results are achieved even without a surface-activating agent (cf., Example 4). However, the properties of the films can be further improved by additionally coupling the silicate to the polymeric matrix using a surface-activating agent (cf., Example 5).

I claim:

1. A method of using a masterbatch composition for making a layered biaxially oriented polyalkylene film comprising,
   a. co-extruding a granulated masterbatch comprising from 1 to 50% by weight of spherical solid silicate particles in a matrix of polyalkylene homopolymer or copolymer based on the total amount thereof, with additional polyalkylene homopolymer or copolymer, wherein the masterbatch further comprises from 0.1 to 15% by weight of a surface-modifying reagent, which reacts with the surface of the silicate, thus improving the adherence between the silicate and the polyalkylene, and wherein the surface-modifying reagent is selected from the group of polypropylene or polyethylene each having grafted maleic anhydride, or an ethylene-acrylic acid copolymer;
   b. making a layered polyalkylene film from the co-extrusion; and
   c. biaxially orienting said layered polyalkylene film, wherein said biaxially oriented polyalkylene film is substantially free of unbound spherical solid silicate particles when slit with a blade.

2. The method according to claim 1, wherein the masterbatch further comprises a polypropylene homo- or random copolymer as matrix.

3. The method according to claim 1, wherein the masterbatch further comprises from 1 to 10% by weight of a spherical silicate and from 0.1 to 10% by weight of a surface-modifying reagent.

4. The method according to claim 1, wherein the surface-modifying reagent is selected from the group of polypropylene, polyethylene of low or high density each having from 0.5 to 2% by weight of grafted maleic anhydride, or an ethylene-acrylic acid copolymer.

5. The method according to claim 1, wherein the polypropylene contains 10% by weight of grafted maleic anhydride.

6. The method according to claim 1, wherein a sodium calcium aluminum silicate, a potassium calcium aluminum silicate or an aluminum silicate is used as silicate.

7. The method according to claim 1, wherein the masterbatch is made by combining a polyalkylene in a compounding device with the surface-modifying reagent, melting and then granulating the masterbatch after cooling.

8. A biaxially oriented, co-extruded multilayer polyalkylene film produced by the method of claim 1, having a thickness of from 5 to 200 μm, consisting of a core layer and one or more exterior layers and containing the masterbatch in the exterior layer.

9. The multilayer polyalkylene film according to claim 8, wherein the exterior layer has a thickness of from 0.25 to 5μm.

10. The multilayer polyalkylene film according to claim 8, containing from 1 to 10% by weight of the masterbatch in the exterior layer.

11. The multilayer polyalkylene film according to claim 8, wherein the exterior layer consists of a polypropylene homopolymer or random copolymer.

* * * * *

UNITED STATES PATENT AND TRADEMARK OFFICE
CERTIFICATE OF CORRECTION

PATENT NO. : 5,969,007  
APPLICATION NO. : 08/809212  
DATED : October 19, 1999  
INVENTOR(S) : Marcel Janssens Page 1 of 1

It is certified that error appears in the above-identified patent and that said Letters Patent is hereby corrected as shown below:

Title page, item [73] assignee: should read -- A. Schulman Plastics --

Signed and Sealed this

Seventeenth Day of November, 2009

David J. Kappos  
*Director of the United States Patent and Trademark Office*